(12) United States Patent
Ganguli

(10) Patent No.: US 9,880,003 B2
(45) Date of Patent: Jan. 30, 2018

(54) HELICOPTER MOTION DETECTION DURING INERTIAL REFERENCE SYSTEM LEVELING

(71) Applicant: Honeywell International Inc., Morristown, NJ (US)

(72) Inventor: Subhabrata Ganguli, Fort Worth, TX (US)

(73) Assignee: Honeywell International Inc., Morris Plains, NJ (US)

( * ) Notice: Subject to any disclaimer, the term of this patent is extended or adjusted under 35 U.S.C. 154(b) by 298 days.

(21) Appl. No.: 14/590,604

(22) Filed: Jan. 6, 2015

(65) Prior Publication Data

US 2016/0195398 A1    Jul. 7, 2016

(51) Int. Cl.
  *G01C 19/56* (2012.01)
  *G01C 21/18* (2006.01)
  *B64C 19/00* (2006.01)
  *G01C 25/00* (2006.01)

(52) U.S. Cl.
  CPC .............. *G01C 21/18* (2013.01); *B64C 19/00* (2013.01); *G01C 25/005* (2013.01)

(58) Field of Classification Search
  CPC ........ G01C 25/005; G01C 19/56; G01P 15/02
  See application file for complete search history.

(56) References Cited

U.S. PATENT DOCUMENTS

| 8,612,145 | B2 | 12/2013 | Chevalier et al. | |
|---|---|---|---|---|
| 2006/0262007 | A1* | 11/2006 | Bonthron | G01S 13/34 342/70 |
| 2011/0005298 | A1 | 1/2011 | Kerbiquet et al. | |
| 2013/0282205 | A1* | 10/2013 | Bailly | B64D 43/00 701/3 |

FOREIGN PATENT DOCUMENTS

| EP | 1862764 | 12/2007 | |
|---|---|---|---|
| WO | 2006025825 | 3/2006 | |
| WO | WO 2006025825 A1 * | 3/2006 | ............. G01C 21/16 |
| WO | 2009083373 | 7/2009 | |

OTHER PUBLICATIONS

Weed et al., "GPS Align in Motion of Civilian Strapdown INS", Apr. 2004, pp. 1-9, Publisher: Honeywell Aviation Products Commercial.
Ford, "Aircraft Engineering and Aerospace Technology", "Aircraft Engineering and Aerospace Technology", 1997, pp. 35-42, vol. 69, No. 1, Publisher: The European Rotorcraft Forum.
European Patent Office, "Extended European Search Report", "from Foreign Counterpart of U.S. Appl. No. 14/590,604", Jun. 14, 2016, pp. 1-7, Published in: EP.

* cited by examiner

*Primary Examiner* — Yuen Wong

(74) *Attorney, Agent, or Firm* — Fogg & Powers LLC

(57) ABSTRACT

A method to level an inertial reference system of a helicopter with reference to the local vertical frame is provided. The method includes powering up the helicopter; outputting sensor data from at least one gyroscope and at least one accelerometer to a mode-selecting processor; executing a fast Fourier transform algorithm on the sensor data at the mode-selecting processor; and selecting one of a plurality of operation modes of the helicopter as a current-operation mode based on the execution of the fast Fourier transform algorithm.

20 Claims, 9 Drawing Sheets

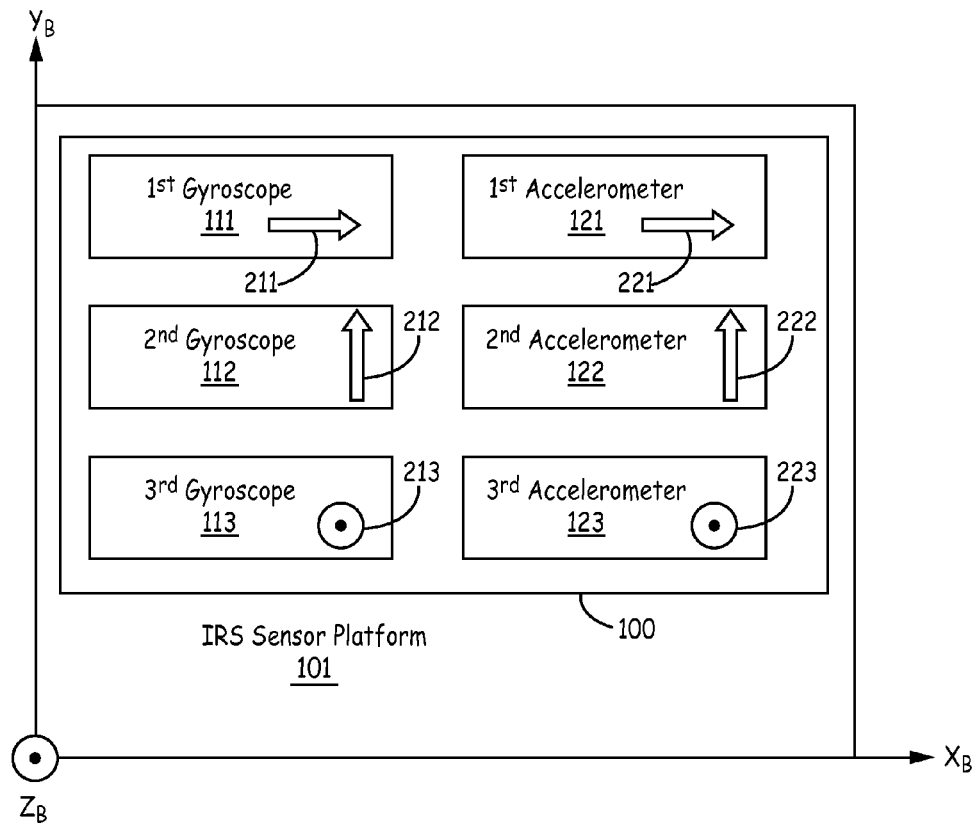
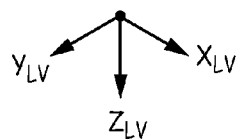
FIG. 2

HELICOPTER MOTION DETECTION DURING INERTIAL REFERENCE SYSTEM LEVELING

BACKGROUND

An Inertial Reference System (IRS) platform needs to be leveled and aligned upon power up before it can be used for navigation. Leveling refers to the process of estimating the initial roll and pitch angle of the platform with respect to the local vertical, while alignment refers to the process of estimating the platform heading angle. It is desirable that the platform is stationary during leveling and alignment.

This is typically not a problem for commercial fixed-wing aircrafts. However, for helicopters, the IRS platform motion can be significant (e.g., if the rotors are on, or if the helicopter is being deployed from an aircraft carrier, or if the helicopter is power cycled in air). The movement of the helicopter degrades the accuracy of the estimated roll and pitch angle output from the leveling algorithm.

Although leveling and alignment can be done while the helicopter is in motion, the algorithms used when in motion are different and the completion time is significantly increased.

SUMMARY

The present application relates to a method to level an inertial reference system of a helicopter with reference to the local vertical frame. The method includes powering up the helicopter; outputting sensor data from at least one gyroscope and at least one accelerometer to a mode-selecting processor; executing a fast Fourier transform algorithm on the sensor data at the mode-selecting processor; and selecting one of a plurality of operation modes of the helicopter as a current-operation mode based on the execution of the fast Fourier transform algorithm.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 2 shows an embodiment of inertial-reference-system sensors for use in the inertial reference system of FIG. 1 in accordance with the present application;

Figure 1:
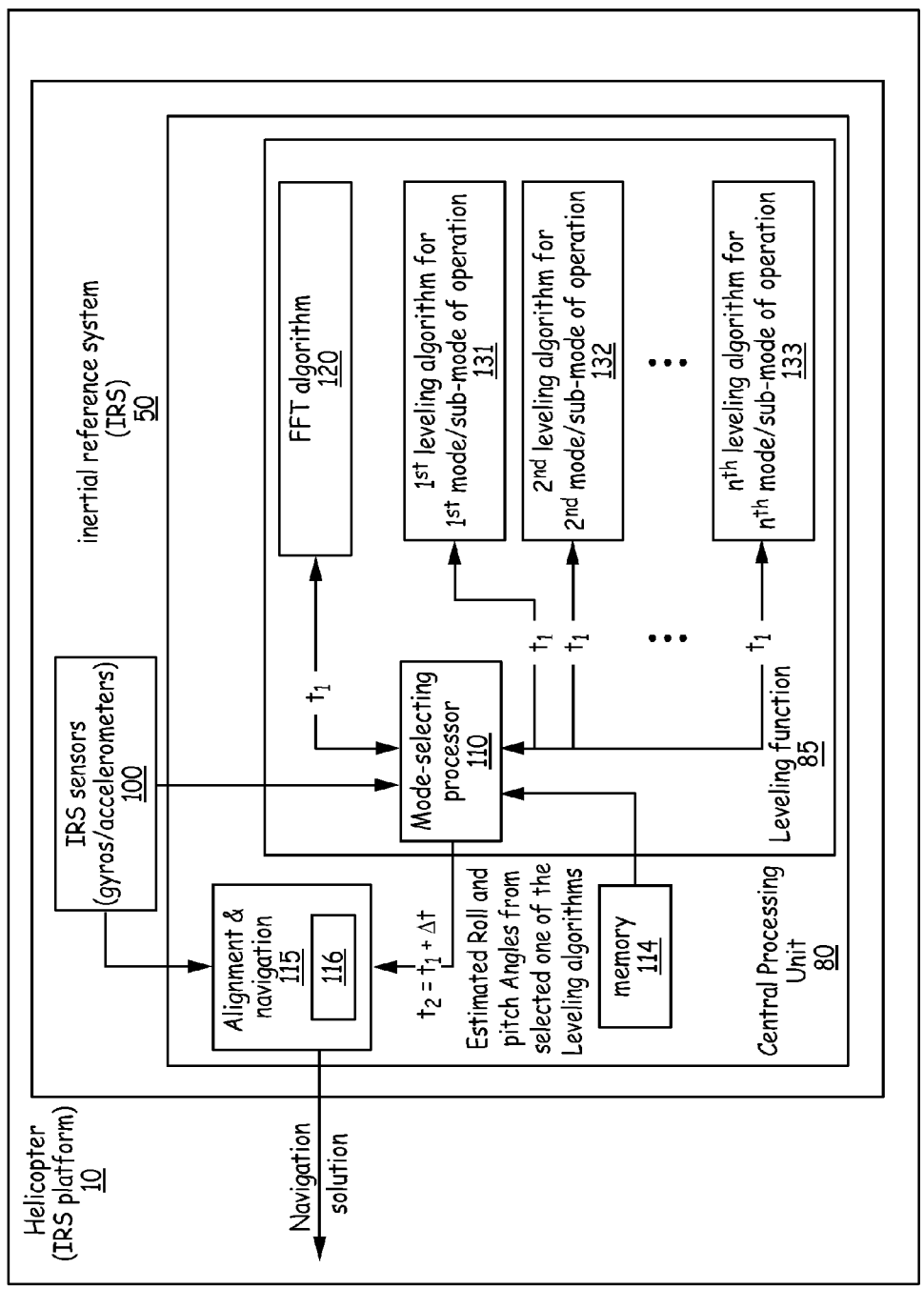
FIG. 1 shows an embodiment of an inertial reference system in accordance with the present application.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

To initialize the IRS, it is important to accurately determine if the platform (helicopter) is stationary or in motion. The embodiments of the described below are used to overcome the problem with estimating the initial roll and pitch angle of the IRS on a helicopter in motion (e.g., if the rotors are on, or if the helicopter is being deployed from an aircraft carrier, or if the helicopter is power cycled in air). Specifically, systems and methods described herein accurately and quickly determine which type of leveling algorithm to use for estimating the initial roll and pitch angle of the IRS platform, which is potentially in one of several types of motions, to ensure the estimated roll and pitch angle output from the leveling algorithm is accurate regardless of the motion of the helicopter.

The systems and methods described herein are used after power up to determine a helicopter operation mode. The operation modes include, but are not limited to, an ON GROUND mode, an IN AIR mode, and an ON SHIP mode. The ON GROUND mode includes ROTORS-OFF sub-mode, ROTORS-ON sub-mode, and sub-modes associated with various types of helicopters. The ON SHIP mode includes a CALM SEA sub-mode and ROUGH SEA sub-mode. Other sub-modes are possible. The terms "operation sub-mode", "sub-mode-of-operation", and "sub-mode" are used interchangeably herein. The "operation mode" is a mode of operation of a helicopter. The "operation sub-mode" is a sub-mode-of-operation of a helicopter.

For each mode and/or sub-mode-of-operation, there is currently available at least one leveling algorithm. After the current-operation mode of the helicopter is determined, an estimated roll and pitch angle is output from the leveling algorithm associated with the current-operation mode. Then the alignment of the IRS platform (i.e., the helicopter) is performed using the appropriately generated roll and pitch angle. This technique can be implemented with any future developed algorithms for modes of operation. Also, this technique can be implemented with more or fewer operation modes.

The term "estimated roll angles and estimated pitch angles" is referred to herein as "estimated roll and pitch angles". The term "estimated roll angle and estimated pitch angle" is referred to herein as "estimated roll and pitch angle".

FIG. 1 shows an embodiment of an inertial reference system 50 in accordance with the present application. The inertial reference system 50 is implemented on a helicopter 10 and includes a central processing unit 80 and inertial reference system (IRS) sensors 100. The helicopter 10 is also referred to herein as an IRS platform 10.

The central processing unit 80 includes alignment and navigation filters 115, a leveling function 85, and a memory 114. The alignment and navigation filters 115 include at least one Kalman filter 116. The leveling function 85 includes a mode-selecting processor 110, a fast Fourier transform (FFT) algorithm 120, and a plurality of leveling algorithms 131-133. The plurality of leveling algorithms 131-133 includes: a first leveling algorithm 131 to output the estimated roll and pitch angle for the helicopter 10 operating in a first mode-of-operation; a second leveling algorithm 132 to output the estimated roll and pitch angle for the helicopter 10 operating in a second mode-of-operation, and an $n^{th}$ leveling algorithm 133 to output the estimated roll and pitch angle for the helicopter 10 operating in an $n^{th}$ mode-of-operation, where n is a positive integer. It is to be understood that the interfaces and connections between the various software and hardware components of the IRS are known to one skilled in the art. The arrows shown in FIG. 1 are representative of an exemplary flow of data that is input and output to and from the various components.

In one implementation of this embodiment, the IRS 50 includes other software and hardware required to perform other functions for an IRS 50 as known to one skilled in the art. These other prior art features are not shown or described herein.

FIG. 2 shows an embodiment of inertial reference system (IRS) sensors 100 for use in the inertial reference system 50 of FIG. 1 in accordance with the present application. The IRS sensors 100 include a first gyroscope 111, a second gyroscope 112, a third gyroscope 113, a first accelerometer 121, a second accelerometer 122, and a third accelerometer 123, which are aligned to the body frame of the helicopter 10 indicated by the exemplary body axes ($X_B$, $Y_B$, $Z_B$) and which are in relationship to the local vertical frame spanned by the axes ($X_{LV}$, $Y_{LV}$, $Z_{LV}$). The local vertical frame axis $Z_{LV}$ is parallel to the gravitation field in the vicinity of the helicopter 10.

The first gyroscope 111 has a first-attitude-sense axis 211 aligned to the body axis $X_B$ of the helicopter platform. The first accelerometer 121 has a first-accelerometer-sense axis 221 that is also aligned to the X body axis $X_B$ of the helicopter platform. Thus, the first gyroscope 111 and the first accelerometer 121 are approximately co-aligned to each other and the body axis $Y_B$ of the helicopter platform. As defined herein, an approximate alignment is an alignment to within 10 degrees.

The second gyroscope 112 has a second-attitude-sense axis 212 approximately aligned to the body axis $Y_B$ of the helicopter platform. The second accelerometer 122 has a second-accelerometer-sense axis 222 that is also approximately aligned to the body axis $Y_B$ of the helicopter platform. Thus, the second gyroscope 112 and the second accelerometer 122 are approximately co-aligned to each other and the body axis $Y_B$ of the helicopter platform.

The third gyroscope 113 has a third-attitude-sense axis 213 approximately aligned to the body axis $Z_B$ of the helicopter platform. The third accelerometer 123 has a third-accelerometer-sense axis 223 that is also approximately aligned to the body axis $Z_B$ of the helicopter platform. Thus, the third gyroscope 113 and the third accelerometer 123 are approximately co-aligned to each other and the body axis $Z_B$ of the helicopter platform.

In this manner, the first gyroscope 111, the second gyroscope 112, the third gyroscope 113, the first accelerometer 121, the second accelerometer 122, and the third accelerometer 123 are orthogonally arranged, at least approximately, to sense the rotational and translational motion in three dimensions. The IRS sensor platform 101 is structured to rigidly support the gyroscopes 111-113 and the accelerometers 121-123 in an orthogonal arrangement. Various structures to rigidly support orthogonally arranged sensors for an IRS sensor platform 101 are known in the art. In one implementation of this embodiment, the sensor axes 211-213 and 221-223 are approximately aligned to the geometry of the IRS sensor platform 101, e.g., the sensor axes 211-213 and 221-223 are aligned with the edges of a cubic-shaped IRS sensor platform 101. In another implementation of this embodiment, the sensor axes 211-213 and 221-223 are not orthogonally arranged. In this case, the IRS 50 is configured to de-convolve the sensor data as known to one skilled in the art. In yet another implementation of this embodiment, the body axes ($X_B$, $Y_B$, $Z_B$) and the sense axes 211-213 and 221 and 223 are not aligned as shown in FIG. 2.

As shown in FIG. 1, the fast Fourier transform (FFT) algorithm 120 inputs sensor data from the IRS sensors 110, performs a fast Fourier transform on the sensor data, and outputs fast-Fourier-transformed-sensor data. The fast-Fourier-transformed-sensor data includes a peak frequency at a Fast Fourier Transform-peak frequency $f_{peak}$ in a zone frequency range of a zone associated with a current-operation mode of the helicopter 10.

In the embodiment of the IRS 50 shown in FIG. 1, the mode-selecting processor 110 executes the plurality of leveling algorithms 131-133 in parallel (i.e., at the same time $t_1$) on the sensor data. Each of the leveling algorithms 131-133 generates an estimated roll angle and an estimated pitch angle for a respective operation mode. When the estimated roll angle and an estimated pitch angle are generated, they are output to the mode-selecting processor 110.

While the mode-selecting processor 110 executes the plurality of leveling algorithms 131-133 in parallel at time $t_1$, the mode-selecting processor 110 also executes the FFT algorithm 120. Output from the FFT algorithm 120 is input at the mode-selecting processor 110 and the mode-selecting processor 110 then determines (also referred to herein as "selects") the current-operation mode from the plurality of operation modes.

Figure 3:
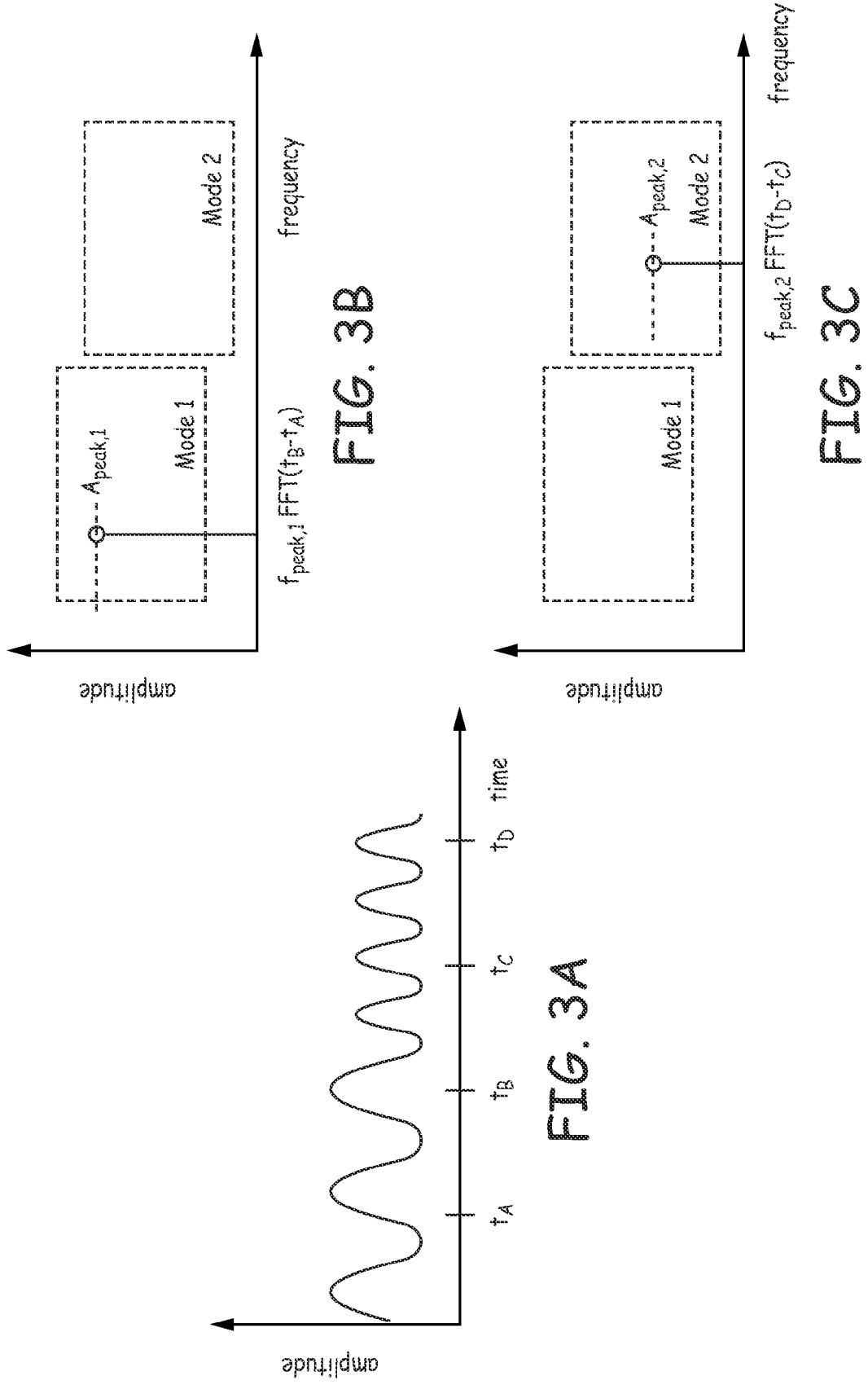
FIG. 3A shows exemplary sensor data from the inertial-reference-system sensors of FIG. 2.
FIGS. 3B and 3C show exemplary peak frequencies for the fast Fourier transform (FFT) of the sensor data with reference to two operation modes.

FIG. 3A shows exemplary sensor data from the inertial-reference-system sensors of FIG. 2. The amplitude of the sensor data plotted versus time is sinusoidal. From time $t_A$ to $t_B$, the amplitude of the sensor data plotted versus time has a first sinusoidal frequency. From time $t_C$ to $t_D$, the amplitude of the sensor data plotted versus time has a second sinusoidal frequency. FIGS. 3B and 3C show exemplary peak frequencies for the fast Fourier transform (FFT) of the sensor data with reference to two operation modes.

FIG. 3B shows the fast-Fourier-transformed-sensor data from the time $t_A$ to $t_B$. The fast-Fourier-transformed-sensor data from the time $t_A$ to $t_B$ includes a FFT-peak frequency $f_{peak}$ at a frequency that coincides with the frequency range of a first mode-of-operation (Mode 1). The FFT-peak frequency $f_{peak,1}$ has a peak amplitude $A_{peak,1}$.

FIG. 3C shows the fast-Fourier-transformed-sensor data from the time $t_C$ to $t_D$. The fast-Fourier-transformed-sensor data from the time $t_C$ to $t_D$ includes a FFT-peak frequency $f_{peak}$ at a frequency that coincides with the frequency range of a second mode-of-operation (represented generally at Mode 2). The FFT-peak frequency $f_{peak,2}$ has a peak amplitude $A_{peak,2}$.

Figure 4:
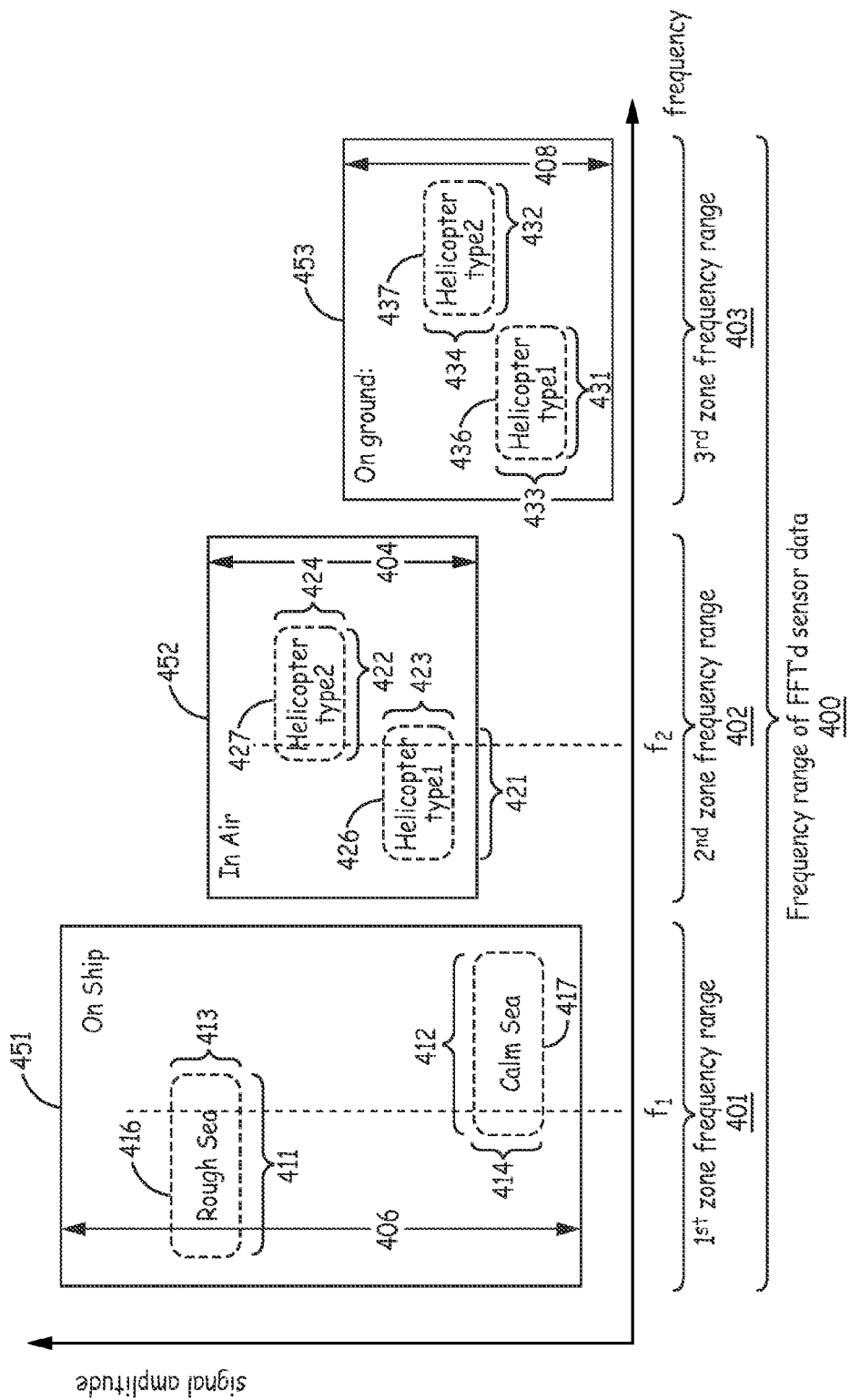
FIG. 4 shows exemplary zones plotted in frequency versus signal amplitude, the zones being associated with respective operation modes of a helicopter.

Additional details about the operation modes (mode-of-operation) are shown in FIG. 4. FIG. 4 shows exemplary zones 451-453 plotted in frequency versus signal amplitude. The zones 451-453 are associated with respective operation modes of a helicopter 10. Each zone is defined by a zone frequency range and a zone amplitude range.

The first zone 451 encompasses the frequency/amplitude space defined by a first zone frequency range 401 and a first zone amplitude range 406. The first zone 451 is associated with the operation mode ON SHIP. The first zone 451 includes two sub-modes-of-operation 416 and 417. The sub-mode-of-operation is defined by a sub-mode frequency range and a sub-mode amplitude range. The first sub-mode-of-operation 416 encompasses the frequency/amplitude space spanned by (defined by) a first sub-mode frequency range 411 and a first sub-mode amplitude range 413. The first sub-mode-of-operation 416 is associated with the operation sub-mode ON SHIP-ROUGH SEA. The second sub-mode-of-operation 417 encompasses the frequency/amplitude space defined by a second sub-mode frequency range 412 and a second sub-mode amplitude range 414. The second sub-mode-of-operation 417 is associated with the operation sub-mode ON SHIP-CALM SEA.

As shown in FIG. 4, the FFT-peak frequency at the exemplary frequency $f_1$ is in both the first sub-mode frequency range 411 and a first sub-mode amplitude range 413. When the fast-Fourier-transformed-sensor data includes FFT-peak frequency at the frequency $f_1$, then the helicopter 10 can be on ship in either rough or calm seas. In this case, the mode-selecting processor 110 analyzes the peak amplitude $A_{peak}$ of the FFT-peak frequency. If the peak amplitude $A_{peak}$ of the FFT-peak frequency is in the first sub-mode amplitude range 413, then the mode-selecting processor 110 determines the helicopter 10 is currently in the operation sub-mode ON SHIP-ROUGH SEA. The leveling function 85 includes a leveling algorithm specifically for a helicopter 10 on a ship and in rough seas. If the peak amplitude $A_{peak}$ of the FFT-peak frequency is in the second sub-mode amplitude range 414, then the mode-selecting processor 110 determines the helicopter 10 is currently in the operation sub-mode ON SHIP-CALM SEA. The leveling function 85 includes a leveling algorithm specifically for a helicopter 10 on a ship and in calm seas. If the peak amplitude $A_{peak}$ of the FFT-peak frequency is not in either of the first sub-mode amplitude range 413 or the second sub-mode amplitude range 414, then the mode-selecting processor 110 determines the helicopter 10 is currently in the operation mode ON SHIP.

The second zone 452 encompasses the frequency/amplitude space defined by a second zone frequency range 402 and a second zone amplitude range 407. The second zone 452 is associated with the operation mode IN AIR. The second zone 452 includes two sub-modes-of-operation 426 and 427. The first sub-mode-of-operation 426 encompasses the frequency/amplitude space spanned by (defined by) a first sub-mode frequency range 421 and a first sub-mode amplitude range 423. The first sub-mode-of-operation 416 is associated with the operation sub-mode IN AIR-HELICOPTER TYPE 1. The second sub-mode-of-operation 427 encompasses the frequency/amplitude space defined by a second sub-mode frequency range 422 and a second sub-mode amplitude range 424. The second sub-mode-of-operation 427 is associated with the operation sub-mode IN AIR-HELICOPTER TYPE 2.

As shown in FIG. 4, the FFT-peak frequency at the exemplary frequency $f_2$ is in both the first sub-mode frequency range 421 and the second sub-mode frequency range 422. When the fast-Fourier-transformed-sensor data includes FFT-peak frequency at the frequency $f_2$, then one of two types of helicopter 10 can be in the air. In this case, the mode-selecting processor 110 analyzes the peak amplitude $A_{peak}$ of the FFT-peak frequency. If the peak amplitude $A_{peak}$ of the FFT-peak frequency is in the first sub-mode amplitude range 423, then the mode-selecting processor 110 determines a type-1 helicopter is currently in air. The leveling function 85 includes a leveling algorithm specific for the type-1 helicopter 10 when it is in the air. If the peak amplitude $A_{peak}$ of the FFT-peak frequency is in the second sub-mode amplitude range 424, then the mode-selecting processor 110 determines a type-2 helicopter is currently in air. The leveling function 85 includes a leveling algorithm specific for the type-2 helicopter 10 when it is in the air. If the peak amplitude $A_{peak}$ of the FFT-peak frequency is not in either of the first sub-mode amplitude range 413 or the second sub-mode amplitude range 414, then the mode-selecting processor 110 determines the helicopter 10 neither of the type-1 or type-2 helicopter is in the air. In this case, a leveling algorithm in the function leveling function 85 is implemented for a generic type of helicopter 10.

The third zone 453 encompasses the frequency/amplitude space defined by a third zone frequency range 403 and a third zone amplitude range 408. The third zone 453 is associated with the operation mode ON GROUND. The first zone 451 includes two sub-modes-of-operation 436 and 437. The first sub-mode-of-operation 436 encompasses the frequency/amplitude space spanned by (defined by) a first sub-mode frequency range 431 and a first sub-mode amplitude range 433. The first sub-mode-of-operation 436 is associated with the operation sub-mode ON GROUND-HELICOPTER TYPE 1. The second sub-mode-of-operation 437 encompasses the frequency/amplitude space defined by a second sub-mode frequency range 432 and a second sub-mode amplitude range 434. The second sub-mode-of-operation 437 is associated with the operation sub-mode ON GROUND-HELICOPTER TYPE 2.

As shown in FIG. 4, there is no FFT-peak frequency in both the first sub-mode frequency range 431 and the first sub-mode amplitude range 432. If the FFT-peak frequency is not in either of the first sub-mode frequency range 431 or the first sub-mode amplitude range 432, a leveling algorithm in the leveling function 85 is implemented for a generic type of helicopter 10. The leveling function 85 includes a leveling algorithm specific for the type-1 helicopter 10 when it is on the ground, a leveling algorithm specific for the type-2 helicopter 10 when it is on the ground.

In one implementation of this embodiment, there are no sub-modes in one or more of the zones.

Figures 5A, 5B:
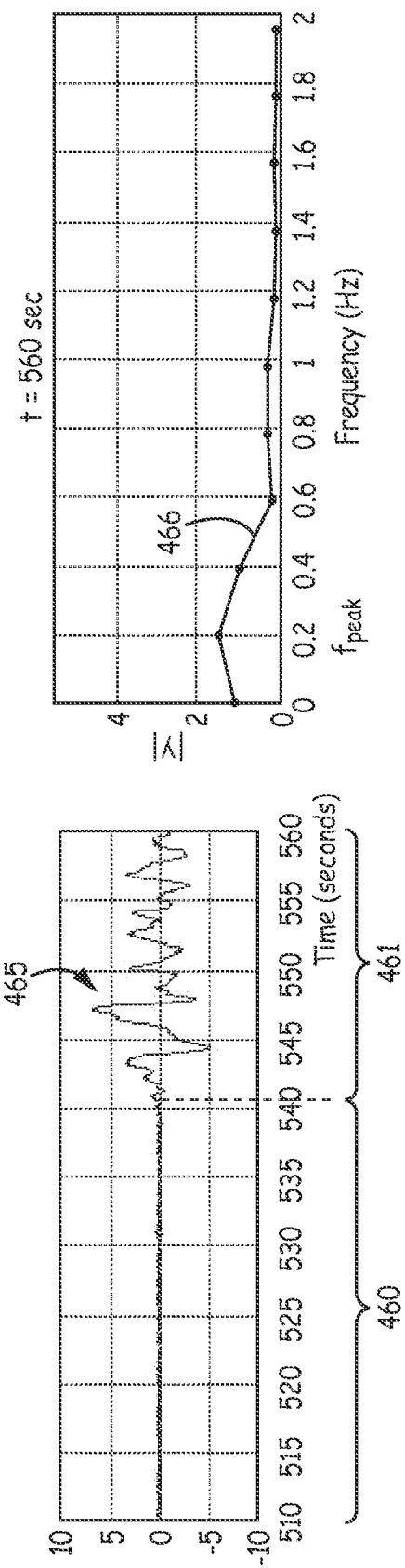
FIGS. 5A and 6A show exemplary sensor data in time for two operation modes.
FIGS. 5B and 6B show the fast Fourier transform of the exemplary sensor data of FIGS. 5A and 6A, respectively.
Figure 6B:
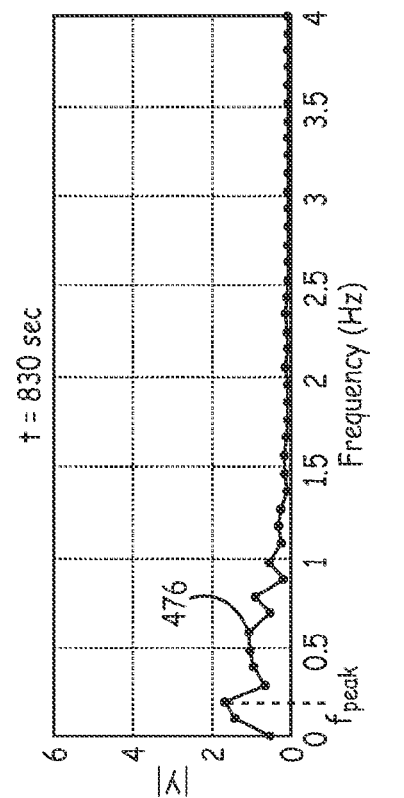
Figure 6A:
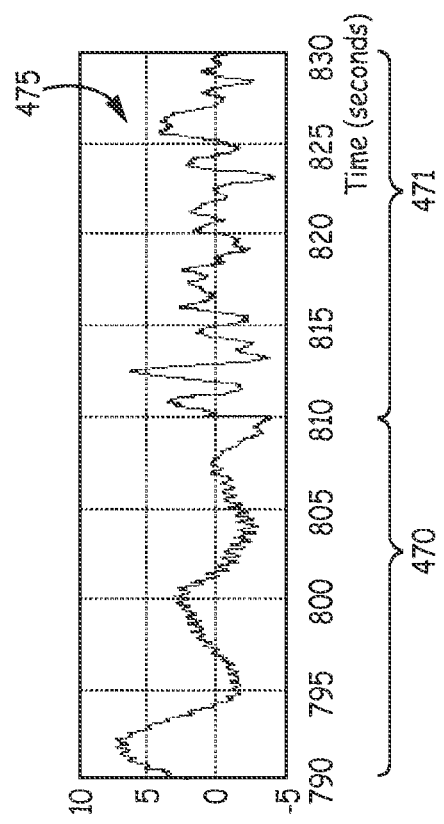

FIGS. 5A and 6A show exemplary sensor data represented generally at 465 and 475, respectively, in time for two operation modes. FIGS. 5B and 6B show the fast Fourier transform of the exemplary sensor data of FIGS. 5A and 6A, respectively.

As shown in FIG. 5A, the sensor data 460 obtained from the IRS sensors 100 from the $510^{th}$ second to about the $540^{th}$ second is relatively flat. This data is typical of the data when the helicopter 10 is on the ground. The sensor data 461 obtained from the IRS sensors 100 from about the $541^{st}$ second to about the $560^{th}$ second is relatively noisy. This data is typical of the data when the helicopter 10 is in the air.

As shown in FIG. 5B, fast-Fourier-transformed-sensor data 466, which is the fast Fourier transform of the sensor data 460, peaks at $f_{peak}$ of 0.2 Hz.

As shown in FIG. 6A, the sensor data 470 obtained from the IRS sensors 100 from the $790^{th}$ second to about the $810^{th}$ second is sinusoidal with an overlaying higher frequency of relatively small amplitude. This data is typical of the data when the helicopter 10 is on a ship. The sensor data 471 obtained from the IRS sensors 100 from about the $810^{th}$ second to about the $830^{th}$ second is relatively noisy as is typical of the data when the helicopter 10 is in the air. As shown in FIG. 6B, fast-Fourier-transformed-sensor data 476, which is the fast Fourier transform of the sensor data 475, peaks at $f_{peak}$ of 0.25 Hz.

Figure 7:
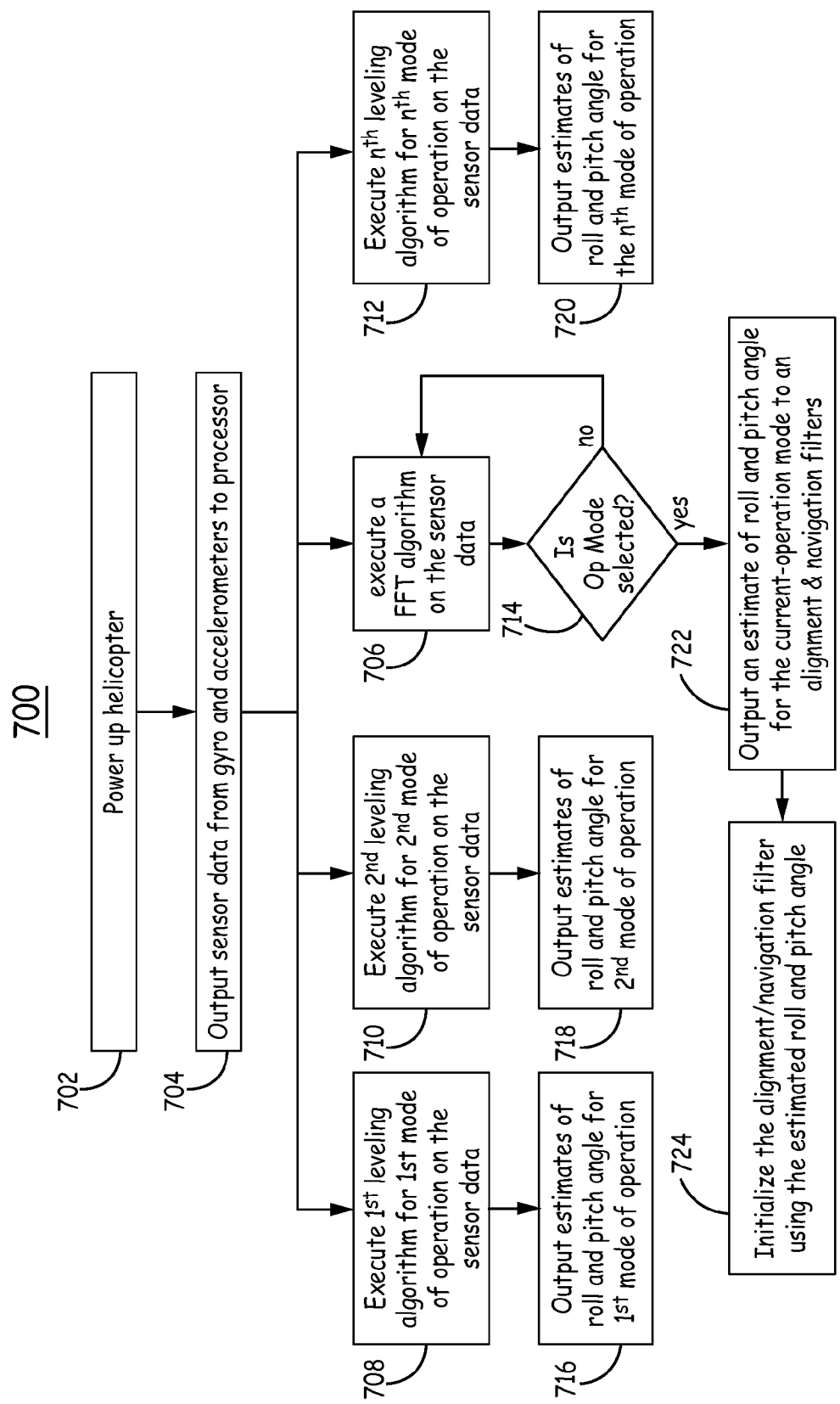
FIG. 7 shows a method to level an inertial reference system with reference to the local vertical frame in a helicopter in accordance with the present application.

FIG. 7 shows a method 700 to level an inertial reference system 50 with reference to the local vertical frame in a helicopter 10 in accordance with the present application. To ensure an accurate leveling and alignment of the helicopter, the motion of helicopter is detected during the leveling process and output from the appropriate leveling algorithm is used to initialize the alignment and navigation filters 115. The local vertical frame axis $Z_{LV}$ (FIG. 2) is parallel to the force of gravity at the helicopter 10. The method 700 is described with reference to the inertial reference system 50 shown in FIG. 1, the zones 451-453 shown in FIG. 4, the exemplary sensor data 470 which is a subset of the sensor data 475 shown in FIG. 6A, and the exemplary fast-Fourier-transformed-sensor data 476 shown in FIG. 6B. One skilled in the art understands that other zones and sensor data can be analyzed to level an inertial reference system 50 with reference to local vertical frame axis $Z_{LV}$ (FIG. 2) in a helicopter 10 in accordance with the present application.

At block 702, the helicopter 10 is powered up. At block 704, sensor data 470 is output from at least one gyroscope 111-113 and at least one accelerometer 121-123 (FIG. 2) to a mode-selecting processor 110 in the inertial reference system 50. At block 706, the mode-selecting processor 110 executes a FFT algorithm 120 on the sensor data 470. The fast-Fourier-transformed-sensor data 476 is output from the FFT algorithm 120 to the mode-selecting processor 110.

At the same time that the mode-selecting processor 110 is executing the FFT algorithm 120, the mode-selecting processor 110 is also executing a plurality of leveling algorithms 131-133.

At block 708, the mode-selecting processor 110 executes a first leveling algorithm 131 for a first mode-of-operation on the sensor data 470. At block 710, the mode-selecting processor 110 executes a second leveling algorithm 132 for a second mode-of-operation on the sensor data 470 while executing the first leveling algorithm 131. At block 712, the mode-selecting processor 110 executes an $n^{th}$ leveling algorithm 132 for an $n^{th}$ mode-of-operation (n is a positive integer) on the sensor data 470 while executing the first leveling algorithm 131 and the second leveling algorithm 132.

In one implementation of this embodiment, the mode-selecting processor 110 executes at least one leveling algorithm for at least one respective sub-mode-of-operation. In another implementation of this embodiment, the mode-selecting processor 110 simultaneously executes on the sensor data 470: a first leveling algorithm 131 for a first-sub-mode 416 of a first mode-of-operation (ON SHIP) associated with first zone 451; a second leveling algorithm 132 for a second-sub-mode 417 of the first mode-of-operation (ON SHIP) associated with first zone 451; a third leveling algorithm for a first-sub-mode 426 of a second mode-of-operation (IN AIR) associated with the second zone 452; and a fourth leveling algorithm 133 for a second-sub-mode 427 of the second mode-of-operation (IN AIR) associated with the second zone 452 on the sensor data 470.

At block 714 it is determined if an operation mode has been selected. If the mode-selecting processor 110 has not determined the current-operation mode at block 714, the flow proceeds back to block 706 from block 714 and mode-selecting processor 110 continues to execute the FFT algorithm 120 on the sensor data 470 that continues to be received from the IRS sensors 100.

The mode-selecting processor 110 selects one of a plurality of operation modes of the helicopter 10 as a current-operation mode based on the execution of the fast Fourier transform (FFT) algorithm 120 at block 706. As described above with reference to FIG. 4, the mode-selecting processor 110 determines if the FFT-peak frequency $f_{peak}$ corresponds to one of the modes of operation. The FFT-peak frequency $f_{peak}$ corresponds to one of the modes of operation when it overlaps with the zone frequency range 401, 402, or 403 of a zone 451, 452, or 453. When the FFT-peak frequency $f_{peak}$ overlaps with a zone frequency range 401, 402, or 403 of a zone 451, 452, or 453, the mode-selecting processor 110 determines which operation mode is associated with the zone and then identifies the current-operation mode as the mode associated with that zone. In this manner, the mode-selecting processor 110 identifies and selects the current-operation mode based on the FFT-peak frequency $f_{peak}$ being in one of the zone frequency range 401, 402, or 403 of a zone 451, 452, or 453.

As described above, a zone is defined by a zone frequency range and a zone amplitude range. In order to make the determination, the mode-selecting processor 110 accesses the zone frequency ranges 401-403 associated with a plurality of zones 451-453 that are stored in memory 114.

If one or more of the zones associated with potential current-operation modes include more than one sub-mode-of-operation, the leveling algorithms being executed during blocks 708, 710, and 712 include at least two leveling algorithms for at least two respective sub-modes of operation. In an embodiment in which the leveling algorithms being executed during blocks 708, 710, and 712 are leveling algorithms for sub-modes of operation, the mode-selecting processor 110 analyzes the fast-Fourier-transformed-sensor data output from the fast Fourier transform (FFT) algorithm 120 to determine the FFT-peak frequency $f_{peak}$ is in a sub-mode frequency range and has a peak amplitude $A_{peak}$ in a sub-mode amplitude range associated with a sub-mode-of-operation in the zone associated with the current-operation mode.

For example, if the mode-selecting processor 110 determines the FFT-peak frequency $f_{peak}$ is in a first-sub-mode frequency range 411, which is a subset of the zone frequency range 401, the mode-selecting processor 110 analyzes the amplitude data of the signal at the FFT-peak frequency $f_{peak}$ to determine if the first-sub-mode-of-operation 416 is the current-operation mode. If the amplitude of the signal at the FFT-peak frequency $f_{peak}$ falls outside of the first-sub-mode amplitude range 413 of the first-sub-mode-of-operation 416, the operation mode is the mode associated with the zone frequency range 401 of the first zone 451 (e.g., ON SHIP). If the amplitude of the signal at the FFT-peak frequency falls within the first-sub-mode amplitude range 413 of the first-sub-mode-of-operation 416 (e.g., ON SHIP-ROUGH SEA), the operation mode is the mode identified by the first-sub-mode frequency range 411 within the zone frequency range 401. In this case, the first-sub-mode-of-operation 416 (e.g., ON SHIP-ROUGH SEA) is the current-operation mode.

As described above with reference to FIG. 4, the mode-selecting processor 110 analyzes the amplitude data of the signal at the FFT-peak frequency $f_{peak}$ to determine which sub-mode (or mode) the current-operation mode when the FFT-peak frequency $f_{peak}$ overlaps with both a first-sub-mode-of-operation and a second-sub-mode-of-operation that are both in the same zone. For the exemplary case described above with reference to FIG. 4, the FFT-peak frequency $f_{peak}$ ($f_1$ as shown in FIG. 4) overlaps with first-sub-mode frequency range 411 associated with the first-sub-mode-of-operation 416 (ON SHIP-ROUGH SEA) and also overlaps with the second-sub-mode frequency range 412 associated with a second-sub-mode-of-operation 417 (ON SHIP-CALM SEA). In order to identify the current-operation mode, the mode-selecting processor 110 analyzes the amplitude data of the signal at the FFT-peak frequency $f_{peak}$ to determine if the peak amplitude of the fast Fourier transformed-sensor data at the FFT-peak frequency $f_{peak}$ falls within the first sub-mode amplitude range 413, the second sub-mode amplitude range 414, or neither.

In this case, if the peak amplitude of the fast Fourier transformed-sensor data at the FFT-peak frequency $f_{peak}$ falls within the first sub-mode amplitude range 413, the mode-selecting processor 110 determines the first-sub-mode-of-operation 416 (ON SHIP-ROUGH SEA) is the current-operation mode. If the peak amplitude of the fast Fourier transformed-sensor data at the FFT-peak frequency $f_{peak}$ falls within the second sub-mode amplitude range 414, the mode-selecting processor 110 determines the second-sub-mode-of-operation 412 (ON SHIP-CALM SEA) is the current-operation mode. Likewise, if the peak amplitude of the fast Fourier transformed-sensor data at the FFT-peak frequency $f_{peak}$ falls outside of both the first sub-mode amplitude range 413 and the second sub-mode amplitude range 414, the mode-selecting processor 110 determines the current-operation mode associated with the first zone 451, i.e., ON SHIP.

In order to make the determination about sub-mode-of-operation, the mode-selecting processor 110 accesses the zone frequency ranges 401-403 and zone amplitude ranges 406-408 associated with a plurality of zones 451-453 that are stored in memory 114.

In this manner, the mode-selecting processor 110 determines the operation mode (or an operation sub-mode) for the helicopter at block 714. If it is determined at block 714, that the operation mode is selected, the flow proceeds to block 722.

At or about the time that the mode-selecting processor 110 is determining the operation mode, the leveling algorithms 131-133 are generating and outputting estimated roll and pitch angles. At block 716, an estimated roll angle and an estimated pitch angle for the first mode-of-operation is output to the mode-selecting processor 110 from the first leveling algorithm 131. At block 718, an estimated roll angle and an estimated pitch angle for the second mode-of-operation is output to the mode-selecting processor 110 from the second leveling algorithm 132. At block 720, an estimated roll angle and an estimated pitch angle for the $n^{th}$ mode-of-operation is output to the mode-selecting processor 110 from the $n^{th}$ leveling algorithm 133. The mode-selecting processor 110 inputs the estimated pitch and roll angles from the leveling algorithms 131-133. Blocks 714, 716, 718, and 720 are implemented at or about the same time $t_1$.

At block 722, the mode-selecting processor 110 outputs the estimated roll and pitch angles that were output from a selected one of the plurality of leveling algorithms 131-133 to the alignment and navigation filters 115. The selected one of the plurality of leveling algorithms 131-133 is that leveling algorithm associated with the current-operation mode. The mode-selecting processor 110 outputs the estimated pitch and roll angles from the leveling algorithms 131-133 that generated the estimated pitch and roll angles for the current-operation mode. At the time $t_2 = t_1 + \Delta t$, the mode-selecting processor 110 sends the estimated roll and pitch angle from the leveling algorithm 131, 132, or 133 that processed the sensor data for the determined operation mode (or operation sub-mode) to the alignment and navigation filters 115.

At block 724, the alignment and navigation filters 115 are initialized using the estimated roll and pitch angle from the appropriate leveling algorithm 131, 132, or 133 to accurately determine the heading of the helicopter 10. In one implementation of this embodiment, at least one Kalman filter 116 (FIG. 1) executes the alignment and navigation filters 115 to output a navigation solution to the appropriate system on the helicopter 10. In this manner, a leveling is accurately and quickly completed by the leveling function 85 in the central processing unit 80. The alignment and navigation filters 115 input estimated roll and pitch angles that are more accurate than estimated roll and pitch angles generated in prior art leveling functions. Consequently, the leveling and alignment is completed for a fast deployment of a helicopter 10 regardless of the type of motion of the helicopter 10 is experiencing during the leveling and alignment.

Figure 8:
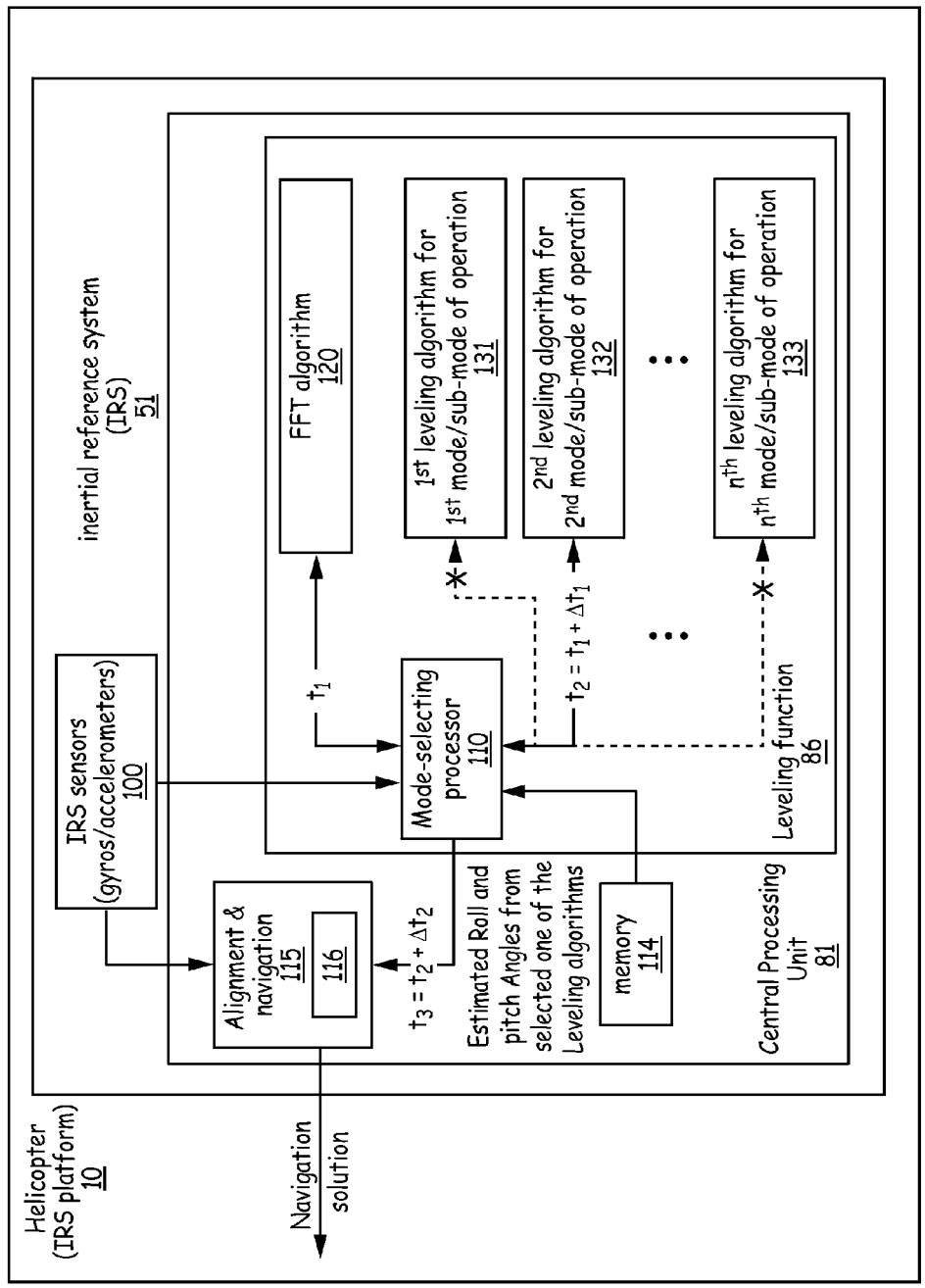
FIG. 8 shows an embodiment of a central processing unit in an inertial reference system in accordance with the present application.

FIG. 8 shows an embodiment of a central processing unit 81 in an inertial reference system 51 in accordance with the present application. The central processing unit 81 in FIG. 8 is similar in structure to the central processing unit 80 of FIG. 1.

The central processing unit 81 in FIG. 8 differs in function from the central processing unit 80 of FIG. 1 in that the processing of one of the plurality of leveling algorithms is done after the mode-selecting processor 110 has determined the current-operation mode of the helicopter 10. Once the mode-selecting processor 110 determines the current-operation mode, the mode-selecting processor 110 executes only the selected leveling algorithm in the leveling function 86 that corresponds to the current-operation mode. In this manner, the power required to process the data for the leveling function 86 is reduced although the time required to complete the leveling is increased over the time required complete the leveling in the leveling function 85 of FIG. 1. However, in this embodiment, the alignment and navigation filters 115 input estimated roll and pitch angles that are more accurate than estimated roll and pitch angles generated in a prior art leveling functions. Consequently, the leveling and alignment is accurately completed for a relatively fast deployment of a helicopter 10 regardless of the type of motion of the helicopter 10 is experiencing during the leveling and alignment by the central processing unit 81.

As shown in FIG. 8, the inertial reference system 51 is implemented on a helicopter 10 and includes a central processing unit 81 and IRS sensors 100. In one implementation of this embodiment, the IRS sensors 100 are as shown in FIG. 2.

The central processing unit 81 includes alignment and navigation filters 115, a leveling function 86, and a memory 114. The alignment and navigation filters 115 include at least one Kalman filter 116. The leveling function 86 includes a mode-selecting processor 110, a fast Fourier transform (FFT) algorithm 120 and a plurality of leveling algorithms 131-133. The plurality of leveling algorithms 131-133 includes: a first leveling algorithm 131 to output the estimated roll and pitch angle for the helicopter 10 operating in a first mode-of-operation; a second leveling algorithm 132 to output the estimated roll and pitch angle for the helicopter 10 operating in a second mode-of-operation; and an $n^{th}$ leveling algorithm 133 to output the estimated roll and pitch angle for the helicopter 10 operating in an $n^{th}$ mode-of-operation.

In one implementation of this embodiment, the IRS 51 includes other software and hardware to perform other functions for an IRS 51 as known to one skilled in the art. These other prior art features are not shown or described herein.

Figure 9:
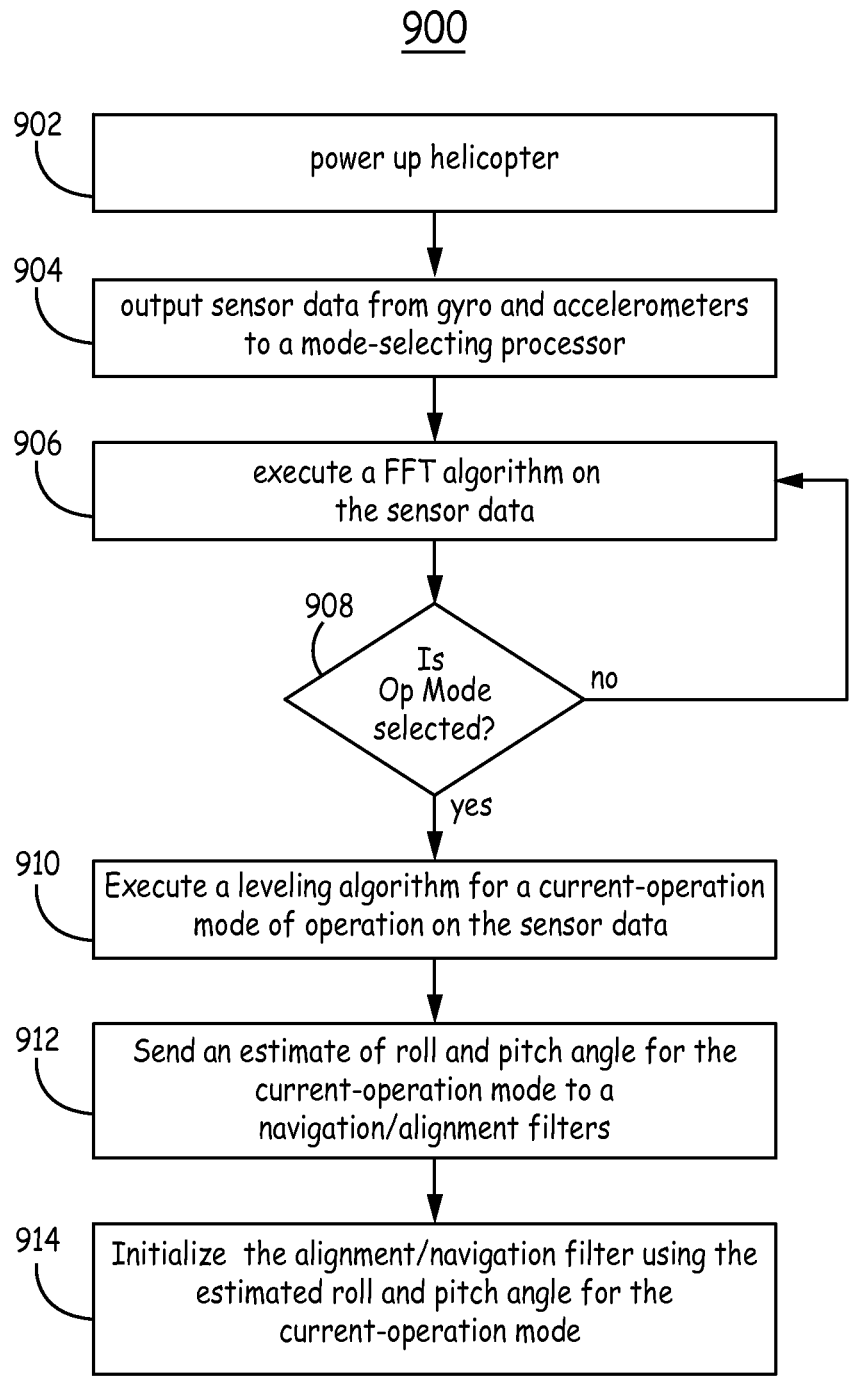
FIG. 9 shows a method to level an inertial reference system with reference to the local vertical frame in a helicopter in accordance with the present application.

FIG. 9 shows a method 900 to level an inertial reference system 51 with reference to local vertical in a helicopter 10 in accordance with the present application. To ensure an accurate leveling and alignment of the helicopter, the motion of helicopter is detected during the leveling process and output from the appropriate leveling algorithm is used to initialize the alignment and navigation filters 115. The method 900 is described with reference to the inertial reference system 51 shown in FIG. 8, the zones 451-453 shown in FIG. 4, the exemplary sensor data 470 which is a subset of the sensor data 475 shown in FIG. 6A, and the exemplary fast-Fourier-transformed-sensor data 476 shown in FIG. 6B. One skilled in the art understands that other zones and sensor data can be analyzed to level an inertial reference system 51 with reference to local vertical frame axis $Z_{LV}$ in a helicopter 10 in accordance with the present application.

At block 902, the helicopter 10 is powered up. At block 904, sensor data 470 is output from at least one gyroscope 111-113 and at least one accelerometer 121-123 to a mode-selecting processor 110 in the inertial reference system 51. At block 906, the mode-selecting processor 110 executes a FFT algorithm 120 on the sensor data 470. The fast-Fourier-transformed-sensor data 476 is output from the FFT algorithm 120 to the mode-selecting processor 110.

At block 908, it is determined if an operation mode has been selected. If the mode-selecting processor 110 has not determined the current-operation mode at block 908, the flow proceeds back to block 906 from block 908 and mode-selecting processor 110 continues to execute the FFT algorithm 120 on the sensor data 470 that continues to be received from the IRS sensors 100. The determination of the current-operation mode is made as described above with reference to block 714 of method 700 in FIG. 7. The mode-selecting processor 110 determines the current-operation mode at time $t_1$. The current-operation mode can be a mode or a sub-mode.

At block 910, the mode-selecting processor 110 executes a selected leveling algorithm 131 for current-operation mode on the sensor data 470 at time $t_2=t_1+\Delta t_1$. The selected leveling algorithm, shown as leveling algorithm 132 in the exemplary case of FIG. 8, is that leveling algorithm associated with the current-operation mode. As indicated by the X's over the dashed arrows connecting the mode-selecting processor 110 to non-selected leveling algorithms 131 and 133, the non-selected leveling algorithms 131 and 133 are not executed by the mode-selecting processor 110 at time $t_2=t_1+\Delta t$. If the motion of the helicopter 10 changes at a later time, (e.g., from CALM SEA sub-mode to ROUGH SEA sub-mode), then at block 910 another leveling algorithm (e.g., leveling algorithm 131) is selected and the previously selected leveling algorithm (e.g., leveling algorithm 132) is non-selected.

At block 912, the mode-selecting processor 110 outputs the estimated roll and pitch angles, which were generated by the selected leveling algorithm 132, to the alignment and navigation filters 115. The mode-selecting processor 110 outputs the estimated pitch and roll angles from the leveling algorithm 132 that generated the estimated pitch and roll angles for the current-operation mode at a time $t_3=t_2+\Delta t_2$.

At block 914, the alignment and navigation filters 115 are initialized using the estimated roll angle and estimated pitch angle from the selected leveling algorithm 132 to accurately determine the heading of the helicopter 10.

In this manner, a leveling of a helicopter 10, which may or may not be in motion, is accurately completed by the leveling function 85 in the central processing unit 80. The alignment and navigation filters 115 input estimated roll and pitch angles that are more accurate than estimated roll and pitch angles generated in a prior art leveling function. Consequently, the leveling and alignment is completed for a relatively fast deployment of a helicopter 10 regardless of the type of motion of the helicopter 10 is experiencing during the leveling and alignment.

The central processing unit 80/81 and the inertial reference system 50/51 include or function with software programs, firmware or other computer readable instructions for carrying out various methods, process tasks, calculations, and control functions, used in the central processing unit 80/81 and the inertial reference system 50/51. The mode-selecting processor 110 executes algorithms 120, 131, 132, 133 and/or firmware that causes the mode-selecting processor 110 to perform at least some of the processing described here as being performed by the inertial reference system 50/51. At least a portion of such algorithms 120, 131, 132, 133 and/or firmware executed by the mode-selecting processor 110 and any related data structures are stored in storage medium during execution. Memory 114 comprises any suitable memory now known or later developed such as, for example, random access memory (RAM), read only memory (ROM), and/or registers within the mode-selecting processor 110. In one implementation, the mode-selecting processor 110 comprises a microprocessor or microcontroller. Moreover, although the mode-selecting processor 110 and memory 114 are shown as separate elements in FIGS. 1 and 8, in one implementation, the mode-selecting processor 110 and memory 114 are implemented in a single device (for example, a single integrated-circuit device). The algorithms 120, 131, 132, 133 and/or firmware executed by the mode-selecting processor 110 comprises a plurality of program instructions that are stored or otherwise embodied on a storage medium from which at least a portion of such program instructions are read for execution by the mode-selecting processor 110. In one implementation, the mode-selecting processor 110 comprises processor support chips and/or system support chips such as ASICs.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

EXAMPLE EMBODIMENTS

Example 1 includes a method to level an inertial reference system of a helicopter with reference to the local vertical frame, the method comprising: powering up the helicopter; outputting sensor data from at least one gyroscope and at least one accelerometer to a mode-selecting processor; executing a fast Fourier transform algorithm on the sensor data at the mode-selecting processor; and selecting one of a plurality of operation modes of the helicopter as a current-operation mode based on the execution of the fast Fourier transform algorithm.

Example 2 includes the method of Example 1, further comprising: executing at least one leveling algorithm on the sensor data, the at least one leveling algorithm being associated with at least one of the plurality of operation modes including the current-operation mode; outputting an estimated roll angle and an estimated pitch angle for the current-operation mode to alignment and navigation filters from the leveling algorithm associated with the current-operation mode; and initializing the alignment/navigation filters using the estimated roll angle the estimated pitch angle sent to the alignment/navigation filter.

Example 3 includes the method of any of Examples 1-2, further comprising: determining a fast Fourier transform (FFT)-peak frequency in fast-Fourier-transformed-sensor data; and identifying the current-operation mode based on the FFT-peak frequency being in a zone frequency range of a zone associated with the current-operation mode, wherein the zone is defined by the zone frequency range and a zone amplitude range.

Example 4 includes the method of Example 3, further comprising: accessing zone frequency ranges and zone amplitude ranges associated with a plurality of zones.

Example 5 includes the method of any of Examples 3-4, wherein the zone associated with the current-operation mode includes more than one sub-mode-of-operation, the method further comprising: determining the FFT-peak frequency is in a first-sub-mode frequency range and is associated with a first-sub-mode-of-operation in the zone associated with the current-operation mode, wherein the first-sub-mode-of-operation is the current-operation mode.

Example 6 includes the method of any of Examples 3-5, wherein the zone associated with the current-operation mode includes more than one sub-mode-of-operation, wherein a sub-mode-of-operation is defined by a sub-mode frequency range and a sub-mode amplitude range, the method further comprising: determining the FFT-peak frequency is in a first-sub-mode frequency range-associated with a first-sub-mode-of-operation and is in a second-sub-mode frequency range associated with a second-sub-mode-of-operation associated with a second-sub-mode-of-operation; determining a peak amplitude of the fast Fourier transformed-sensor data at the FFT-peak frequency; and identifying the current-operation mode based on the peak amplitude of the fast Fourier transformed-sensor data at the FFT-peak frequency being in the first-sub-mode amplitude range of the first-sub-mode-of-operation, wherein the first-sub-mode-of-operation is the current-operation mode.

Example 7 includes the method of any of Examples 1-6, further comprising: executing a first leveling algorithm for a first mode-of-operation on the sensor data; executing a second leveling algorithm for a second mode-of-operation on the sensor data while executing the first leveling algorithm; outputting an estimated roll angle and an estimated pitch angle for the first mode-of-operation to the mode-selecting processor from the first leveling algorithm; and outputting an estimated roll angle and an estimated pitch angle for the second mode-of-operation to the mode-selecting processor from the second leveling algorithm.

Example 8 includes the method of Example 7, further comprising: determining a fast Fourier transform (FFT)-peak frequency corresponds to one of the modes of operation; selecting the determined mode-of-operation as the current-operation mode; and outputting the estimated roll angle and the estimated pitch angle for the current-operation mode to the alignment/navigation filters.

Example 9 includes the method of any of Examples 1-8, further comprising: executing a first leveling algorithm for a first-sub-mode of a first mode-of-operation on the sensor data; executing a second leveling algorithm for a second-sub-mode of the first mode-of-operation on the sensor data; executing a third leveling algorithm for a first-sub-mode of a second mode-of-operation on the sensor data; executing a fourth leveling algorithm for a second-sub-mode of the second mode-of-operation on the sensor data; outputting an estimated roll angle and an estimated pitch angle for the first-sub-mode of the first mode-of-operation to the mode-selecting processor from the first leveling algorithm; outputting an estimated roll angle and an estimated pitch angle for the second-sub-mode of the first mode-of-operation to the mode-selecting processor from the second leveling algorithm; outputting an estimated roll angle and an estimated pitch angle for the first-sub-mode of the second mode-of-operation to the mode-selecting processor from the third leveling algorithm; and outputting an estimated roll angle and an estimated pitch angle for the second-sub-mode of the second mode-of-operation to the mode-selecting processor from the fourth leveling algorithm.

Example 10 includes the method of Example 9, further comprising: determining a fast Fourier transform (FFT)-peak frequency corresponds to one of the sub-modes; selecting the determined sub-mode-of-operation as the current-operation mode; and outputting the estimated roll angle and the estimated pitch angle for the current-operation mode to an alignment/navigation filter.

Example 11 includes the method of any of Examples 1-10, further comprising: determining a fast Fourier transform (FFT)-peak frequency corresponds to one of the plurality of operation modes; selecting the determined mode-of-operation as the current-operation mode; and executing a leveling algorithm associated with the selected operation mode on the sensor data based in the selecting; and outputting an estimated roll angle and an estimated pitch angle for the current-operation mode to an alignment/navigation filter from the leveling algorithm for the selected operation mode.

Example 12 includes the method of any of Examples 1-11, further comprising: determining a fast Fourier transform (FFT)-peak frequency corresponds to one of a plurality of sub-modes of operation; selecting the determined sub-mode-of-operation as the current-operation mode; executing a leveling algorithm associated with the identified sub-mode-of-operation based on the selecting; and outputting an estimated roll angle and an estimated pitch angle for the identified sub-mode-of-operation to the alignment and navigation filters from the leveling algorithm associated with the identified sub-mode-of-operation.

Example 13 includes an inertial reference system for a helicopter, the inertial reference system comprising: a plurality of inertial reference system sensors to output sensor data to a mode-selecting processor; a fast Fourier transform (FFT) algorithm to transform the sensor data and output fast-Fourier-transformed-sensor data, the fast-Fourier-transformed-sensor data including a Fast Fourier Transform (FFT)-peak frequency in a zone frequency range of a zone associated with a current-operation mode of the helicopter; a plurality of leveling algorithms to execute on the sensor data and output a respective plurality of estimated roll angles and a respective plurality of estimated pitch angles for a respective plurality of operation modes; and a mode-selecting processor to: input the fast-Fourier-transformed-sensor data; identify a current-operation mode of the helicopter based on the FFT-peak frequency being in the zone frequency range of the zone associated with the current-operation mode; and output one of the plurality of estimated roll angles and one of the plurality of estimated pitch angles associated with the current-operation mode to alignment and navigation filters.

Example 14 includes the inertial reference system of Example 13, further comprising: the alignment and navigation filters to input one of the plurality of estimated roll angles and one of the plurality of estimated pitch angles associated with the identified operation mode, wherein the alignment and navigation filters are initialized based on the estimated roll angles and one of the plurality of estimated pitch angle input by the alignment and navigation filters.

Example 15 includes the inertial reference system of any of Examples 13-14, wherein the plurality of leveling algorithms comprise: a first leveling algorithm to output the estimated roll angle and the estimated pitch angle for the helicopter operating in a first mode-of-operation; and a second leveling algorithm to output the estimated roll angle and the estimated pitch angle for the helicopter operating in a second mode-of-operation.

Example 16 includes the inertial reference system of any of Examples 13-15, wherein the mode-selecting processor analyzes fast-Fourier-transformed-sensor data output from the fast Fourier transform algorithm to determine the FFT-peak frequency is in at least one of: a first-sub-mode frequency range associated with a first-sub-mode-of-operation; and a second-sub-mode frequency range associated with a second-sub-mode-of-operation, wherein the mode-selecting processor identifies the current-operation mode based on the peak amplitude of the fast Fourier transformed-sensor data at the FFT-peak frequency being in the first-sub-mode amplitude range of the first-sub-mode-of-operation, wherein the first-sub-mode-of-operation is the current-operation mode.

Example 17 includes the inertial reference system of any of Examples 13-16, wherein at least one of the plurality of leveling algorithms comprise: at least one leveling algorithm to output the estimated roll angle and the estimated pitch angle for the helicopter operating in a sub-mode of one of the plurality of operation modes.

Example 18 includes a central processing unit to level an inertial reference system, comprising: a fast Fourier transform (FFT) algorithm to transform sensor data input from a plurality of inertial-reference-system sensors and to output fast-Fourier-transformed-sensor data, the fast-Fourier-transformed-sensor data including a Fast Fourier Transform (FFT)-peak frequency in a zone frequency range of a zone associated with a current-operation mode of the helicopter; a plurality of leveling algorithms to execute on the sensor data and output a respective plurality of estimated roll angles and a respective plurality of estimated pitch angles for a respective plurality of operation modes; and a mode-selecting processor to: input the fast-Fourier-transformed-sensor data; identify a current-operation mode of the helicopter based on the FFT-peak frequency being in the zone frequency range of the zone associated with the current-operation mode; and output one of the plurality of estimated roll angles and one of the plurality of estimated pitch angles associated with the current-operation mode to alignment and navigation filters; the alignment and navigation filters to input one of the plurality of estimated roll angles and one of the plurality of estimated pitch angles associated with the identified operation mode, wherein the alignment and navigation filters are initialized based on the estimated roll angles and one of the plurality of estimated pitch angle input by the alignment and navigation filters.

Example 19 includes the central processing unit of Example 18, wherein the plurality of leveling algorithms comprise: a first leveling algorithm to output the estimated roll angle and the estimated pitch angle for the helicopter operating in a first mode-of-operation; and a second leveling algorithm to output the estimated roll angle and the estimated pitch angle for the helicopter operating in a second mode-of-operation.

Example 20 includes the central processing unit of any of Examples 18-19, wherein the mode-selecting processor analyzes fast-Fourier-transformed-sensor data output from the fast Fourier transform (FFT) algorithm: to determine the FFT-peak frequency is in at least one of: a first-sub-mode frequency range associated with a first-sub-mode-of-operation; and a second-sub-mode frequency range associated with a second-sub-mode-of-operation; and to identify the current-operation mode based on the peak amplitude of the fast Fourier transformed-sensor data at the FFT-peak frequency being in the first-sub-mode amplitude range of the first-sub-mode-of-operation, wherein the first-sub-mode-of-operation is the current-operation mode.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method to level an inertial reference system of a helicopter with reference to a local vertical frame, the method comprising:
   powering up the helicopter, wherein the inertial reference system comprises at least one gyroscope and at least one accelerometer aligned to a body frame of the helicopter;
   sensing, by the inertial reference system, rotational and translational motion of the helicopter in three dimensions;
   outputting sensor data from the at least one gyroscope and the at least one accelerometer to a mode-selecting processor, wherein the sensor data comprises measurements of the rotational and translational motion of the helicopter in three dimensions;
   executing a fast Fourier transform algorithm on the sensor data at the mode-selecting processor;
   sensing which one of a plurality of operation modes of the helicopter is a current-operation mode based on the execution of the fast Fourier transform algorithm; and
   after the current-operation mode of the helicopter is determined, executing with the mode-selecting processor a leveling algorithm defined for use with the current-operation mode to estimate a roll and a pitch angle, wherein for each of the plurality of operation modes there is available at least one leveling algorithm;

wherein the inertial reference system translates the rotational and translational motion of the helicopter in three dimensions into the local vertical frame based on the current-operation mode of the helicopter to level the inertial reference system, wherein the local vertical frame includes one axis parallel to a gravitation field in a vicinity of the helicopter.

2. The method of claim 1, further comprising:
executing at least one leveling algorithm on the sensor data, the at least one leveling algorithm being associated with at least one of the plurality of operation modes including the current-operation mode;
outputting the estimated roll angle and the estimated pitch angle for the current-operation mode to alignment and navigation filters from the leveling algorithm associated with the current-operation mode; and
initializing the alignment and navigation filters using the estimated roll angle and the estimated pitch angle sent to the alignment and navigation filters.

3. The method of claim 1, further comprising:
determining a fast Fourier transform (FFT)-peak frequency in fast-Fourier-transformed-sensor data; and
identifying the current-operation mode based on the FFT-peak frequency being in a zone frequency range of a zone associated with the current-operation mode, wherein the zone is defined by the zone frequency range and a zone amplitude range.

4. The method of claim 3, further comprising:
accessing zone frequency ranges and zone amplitude ranges associated with a plurality of zones.

5. The method of claim 3, wherein the zone associated with the current-operation mode includes more than one sub-mode-of-operation, the method further comprising:
determining the FFT-peak frequency is in a first-sub-mode frequency range and is associated with a first-sub-mode-of-operation in the zone associated with the current-operation mode, wherein the first-sub-mode-of-operation is the current-operation mode.

6. The method of claim 3, wherein the zone associated with the current-operation mode includes more than one sub-mode-of-operation, wherein a sub-mode-of-operation is defined by a sub-mode frequency range and a sub-mode amplitude range,
the method further comprising:
determining the FFT-peak frequency is in a first-sub-mode frequency range associated with a first-sub-mode-of-operation and is in a second-sub-mode frequency range associated with a second-sub-mode-of-operation associated with a second-sub-mode-of-operation;
determining a peak amplitude of the fast Fourier transformed-sensor data at the FFT-peak frequency; and
identifying the current-operation mode based on the peak amplitude of the fast Fourier transformed-sensor data at the FFT-peak frequency being in a first-sub-mode amplitude range of the first-sub-mode-of-operation, wherein the first-sub-mode-of-operation is the current-operation mode.

7. The method of claim 1, further comprising:
executing a first leveling algorithm for a first mode-of-operation on the sensor data;
executing a second leveling algorithm for a second mode-of-operation on the sensor data while executing the first leveling algorithm;

outputting an estimated roll angle and an estimated pitch angle for the first mode-of-operation to the mode-selecting processor from the first leveling algorithm; and
outputting an estimated roll angle and an estimated pitch angle for the second mode-of-operation to the mode-selecting processor from the second leveling algorithm.

8. The method of claim 7, further comprising:
determining a fast Fourier transform (FFT)-peak frequency corresponds to one of the modes of operation;
selecting the determined mode-of-operation as the current-operation mode; and
outputting the estimated roll angle and the estimated pitch angle for the current-operation mode to the alignment and navigation filters.

9. The method of claim 1, further comprising:
executing a first leveling algorithm for a first-sub-mode of a first mode-of-operation on the sensor data;
executing a second leveling algorithm for a second-sub-mode of the first mode-of-operation on the sensor data;
executing a third leveling algorithm for a first-sub-mode of a second mode-of-operation on the sensor data;
executing a fourth leveling algorithm for a second-sub-mode of the second mode-of-operation on the sensor data;
outputting an estimated roll angle and an estimated pitch angle for the first-sub-mode of the first mode-of-operation to the mode-selecting processor from the first leveling algorithm;
outputting an estimated roll angle and an estimated pitch angle for the second-sub-mode of the first mode-of-operation to the mode-selecting processor from the second leveling algorithm;
outputting an estimated roll angle and an estimated pitch angle for the first-sub-mode of the second mode-of-operation to the mode-selecting processor from the third leveling algorithm; and
outputting an estimated roll angle and an estimated pitch angle for the second-sub-mode of the second mode-of-operation to the mode-selecting processor from the fourth leveling algorithm.

10. The method of claim 9, further comprising:
determining a fast Fourier transform (FFT)-peak frequency corresponds to one of the sub-modes;
selecting the determined sub-mode-of-operation as the current-operation mode; and
outputting the estimated roll angle and the estimated pitch angle for the current-operation mode to an alignment/navigation filter.

11. The method of claim 1, further comprising:
determining a fast Fourier transform (FFT)-peak frequency corresponds to one of the plurality of operation modes;
selecting the determined mode-of-operation as the current-operation mode;
executing a leveling algorithm associated with the selected operation mode on the sensor data based in the selecting; and
outputting an estimated roll angle and an estimated pitch angle for the current-operation mode to an alignment/navigation filter from the leveling algorithm for the selected operation mode.

12. The method of claim 1, further comprising:
determining a fast Fourier transform (FFT)-peak frequency corresponds to one of a plurality of sub-modes of operation;

selecting the determined sub-mode-of-operation as the current-operation mode;
executing a leveling algorithm associated with the identified sub-mode-of-operation based on the selecting; and
outputting an estimated roll angle and an estimated pitch angle for the identified sub-mode-of-operation to the alignment and navigation filters from the leveling algorithm associated with the identified sub-mode-of-operation.

13. An inertial reference system for a helicopter with reference to a local vertical frame, the inertial reference system comprising:
a mode-selecting processor;
a plurality of inertial reference system sensors mounted to the helicopter, wherein the plurality of inertial reference system sensors output sensor data to the mode-selecting processor;
wherein the plurality of inertial reference system sensors comprise at least one gyroscope and at least one accelerometer aligned to a body frame of the helicopter, wherein the plurality of inertial reference system sensors sense rotational and translational motion of the helicopter in three dimensions and the sensor data comprises measurements of the rotational and translational motion of the helicopter in three dimensions;
a fast Fourier transform (FFT) algorithm to transform the sensor data and output fast-Fourier-transformed-sensor data, the fast-Fourier-transformed-sensor data including a Fast Fourier Transform (FFT)-peak frequency in a zone frequency range of a zone associated with a current-operation mode of the helicopter; and
a plurality of leveling algorithms to execute on the sensor data and output a respective plurality of estimated roll angles and a respective plurality of estimated pitch angles for a respective plurality of operation modes of the helicopter, wherein for each of the plurality of operation modes of the helicopter there is available at least one leveling algorithm, and
wherein the mode-selecting processor:
inputs the fast-Fourier-transformed-sensor data;
identifies which one of the plurality of operation modes of the helicopter is a current-operation mode based on the FFT-peak frequency being in the zone frequency range of the zone associated with the current-operation mode; and
outputs one of the plurality of estimated roll angles and one of the plurality of estimated pitch angles from a leveling algorithm associated with the current-operation mode to alignment and navigation filters,
wherein the inertial reference system translates the rotational and translational motion of the helicopter in three dimensions into the local vertical frame based on the current-operation mode of the helicopter to level the inertial reference system, wherein the local vertical frame includes one axis parallel to a gravitation field in a vicinity of the helicopter.

14. The inertial reference system of claim 13, further comprising:
the alignment and navigation filters to input one of the plurality of estimated roll angles and one of the plurality of estimated pitch angles associated with the identified operation mode, wherein the alignment and navigation filters are initialized based on the estimated roll angles and one of the plurality of estimated pitch angle input by the alignment and navigation filters.

15. The inertial reference system of claim 13, wherein the plurality of leveling algorithms comprise:
a first leveling algorithm to output the estimated roll angle and the estimated pitch angle for the helicopter operating in a first mode-of-operation; and
a second leveling algorithm to output the estimated roll angle and the estimated pitch angle for the helicopter operating in a second mode-of-operation.

16. The inertial reference system of claim 13, wherein the mode-selecting processor analyzes fast-Fourier-transformed-sensor data output from the fast Fourier transform algorithm to determine the FFT-peak frequency is in at least one of: a first-sub-mode frequency range associated with a first-sub-mode-of-operation; and a second-sub-mode frequency range associated with a second-sub-mode-of-operation,
wherein the mode-selecting processor identifies the current-operation mode based on a peak amplitude of the fast Fourier transformed-sensor data at the FFT-peak frequency being in a first-sub-mode amplitude range of the first-sub-mode-of-operation, wherein the first-sub-mode-of-operation is the current-operation mode.

17. The inertial reference system of claim 13, wherein at least one of the plurality of leveling algorithms comprise:
at least one leveling algorithm to output the estimated roll angle and the estimated pitch angle for the helicopter operating in a sub-mode of one of the plurality of operation modes.

18. A central processing unit to level an inertial reference system of a helicopter with reference to a local vertical frame, comprising:
a fast Fourier transform (FFT) algorithm to transform sensor data input from a plurality of inertial-reference-system sensors and to output fast-Fourier-transformed-sensor data, wherein the plurality of inertial reference system sensors comprise at least one gyroscope and at least one accelerometer aligned to a body frame of the helicopter, wherein the plurality of inertial reference system sensors sense rotational and translational motion of the helicopter in three dimensions, and the sensor data comprises measurements of the rotational and translational motion of the helicopter in three dimensions;
wherein the fast-Fourier-transformed-sensor data includes a Fast Fourier Transform (FFT)-peak frequency in a zone frequency range of a zone associated with a current-operation mode of the helicopter;
a plurality of leveling algorithms to execute on the sensor data and output a respective plurality of estimated roll angles and a respective plurality of estimated pitch angles for a respective plurality of operation modes of the helicopter, wherein for each of the plurality of operation modes of the helicopter there is available at least one leveling algorithm;
a mode-selecting processor to:
input the fast-Fourier-transformed-sensor data;
identify which one of a plurality of operation modes of the helicopter is a current-operation mode based on the FFT-peak frequency being in the zone frequency range of the zone associated with the current-operation mode; and
output one of the plurality of estimated roll angles and one of the plurality of estimated pitch angles from a leveling algorithm associated with the current-operation mode to alignment and navigation filters,
wherein the central processing unit translates the rotational and translational motion of the helicopter in three dimensions into the local vertical frame based on the current-operation mode of the helicopter to level the inertial reference system, wherein the local vertical frame includes one axis parallel to a gravitation field in a vicinity of the helicopter; and alignment and navigation filters to input one of the plurality of estimated roll angles and one of the plurality of estimated pitch angles associated with the identified operation mode, wherein the alignment and navigation filters are initialized based on the estimated roll angles and one of the plurality of estimated pitch angle input by the alignment and navigation filters.

19. The central processing unit of claim 18, wherein the plurality of leveling algorithms comprise:

a first leveling algorithm to output the estimated roll angle and the estimated pitch angle for the helicopter operating in a first mode-of-operation; and a second leveling algorithm to output the estimated roll angle and the estimated pitch angle for the helicopter operating in a second mode-of-operation.

20. The central processing unit of claim 18, wherein the mode-selecting processor analyzes fast-Fourier-transformed-sensor data output from the fast Fourier transform (FFT) algorithm:

to determine the FFT-peak frequency is in at least one of:

a first-sub-mode frequency range associated with a first-sub-mode-of-operation; and a second-sub-mode frequency range associated with a second-sub-mode-of-operation; and to identify the current-operation mode based on a peak amplitude of the fast Fourier transformed-sensor data at the FFT-peak frequency being in a first-sub-mode amplitude range of the first-sub-mode-of-operation, wherein the first-sub-mode-of-operation, wherein the first-sub-mode-of-operation is the current-operation mode.

* * * * *